March 29, 1960 A. HERTZBERG ET AL 2,930,196
VALVED INTERMITTENT COMBUSTION REACTION ENGINE
Filed March 30, 1951
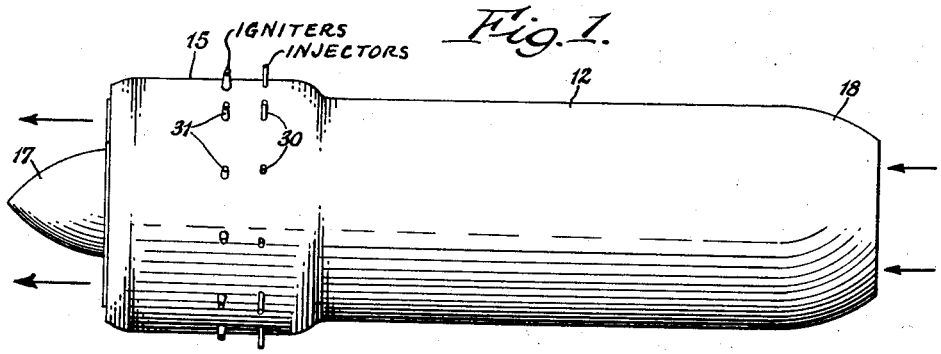
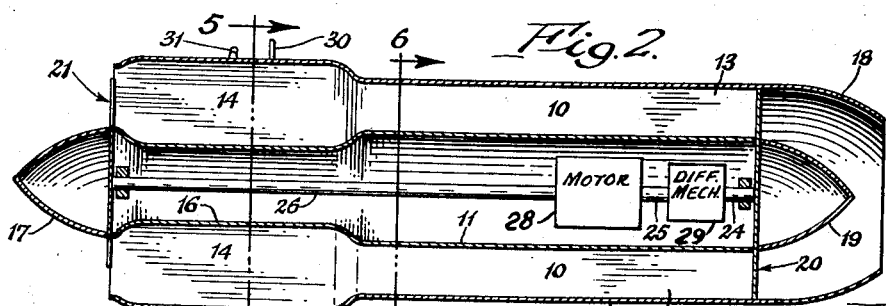
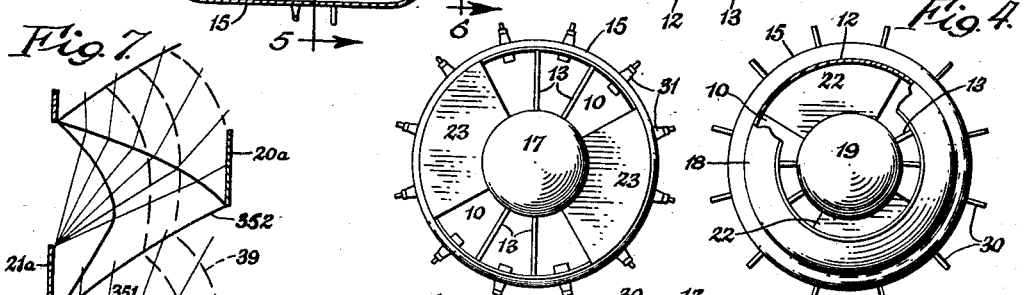
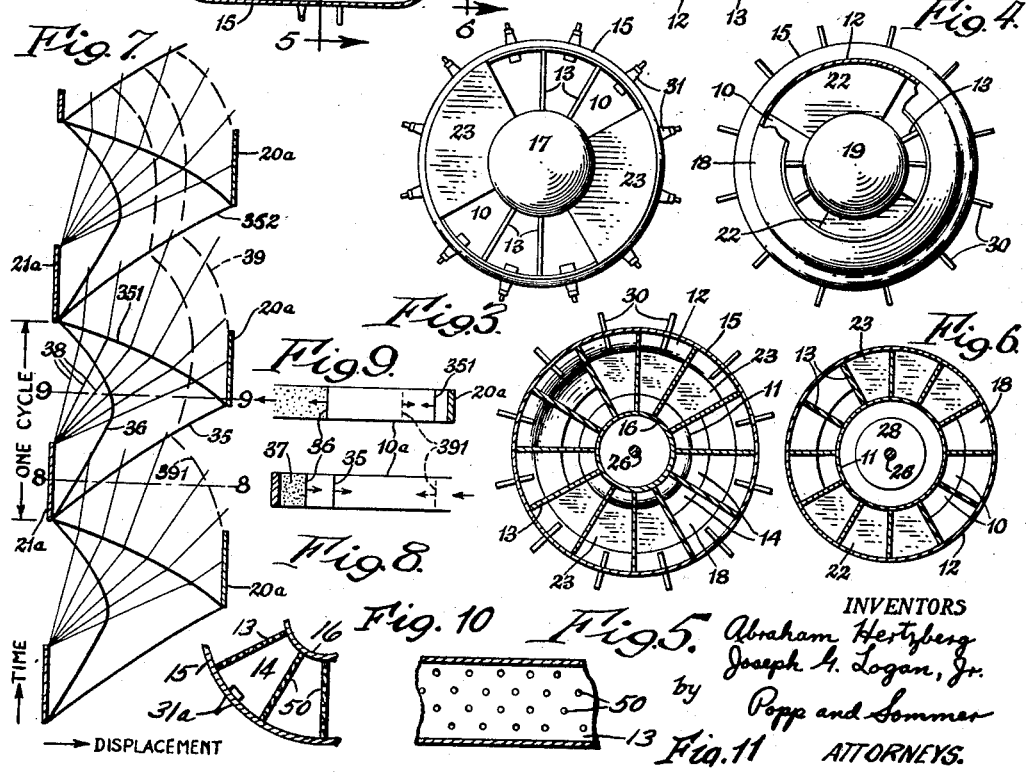
INVENTORS
Abraham Hertzberg
Joseph H. Logan, Jr.
by Popp and Sommer
ATTORNEYS.

United States Patent Office 2,930,196
Patented Mar. 29, 1960

2,930,196

VALVED INTERMITTENT COMBUSTION REACTION ENGINE

Abraham Hertzberg and Joseph G. Logan, Jr., Buffalo, N.Y., assignors to Cornell Aeronautical Laboratory, Inc., Buffalo, N.Y., a corporation of New York Application March 30, 1951, Serial No. 218,456

1 Claim. (Cl. 60—39.76)

This invention relates to a thermal engine and a method of operating the same.

The principal object of the invention is to provide a high pressure ratio thermal engine in which the compression and expansion processes are carried out by non-steady wave phenomena so as to eliminate the need for the usual reciprocating mechanical piston.

Another important object of the invention is to provide such a thermal engine in which wave energy is conserved by continuous reflections of a shock wave and reinforcing this shock wave by combustion, such an engine being hereinafter referred to as a resonant internal combustion engine.

Another important object is to provide such a resonant internal combustion engine in which the resonating shock wave is utilized to compress a combustible fuel and air mixture during each cycle of operation of the engine.

Another important object is to provide such a resonant internal combustion engine in which advantage may be taken of the pressure drop resulting from exhausting the products of combustion during one operating cycle of the engine to generate an expansion wave to induct a fresh charge of air to support the combustion of fuel during a subsequent operating cycle.

A further object is to provide such a resonant internal combustion engine which is relatively simple in construction and inexpensive to manufacture.

A further object is to provide such a resonant internal combustion engine which is highly efficient in operation.

A further aim is to provide such a resonant internal combustion engine in which throttling may be easily accomplished without loss in efficiency.

Other objects and advantages of the invention will be apparent from the following description and accompanying drawings in which:

Fig. 1 is a side elevational view of a resonant internal combustion engine embodying the present invention and suitable for employment as a jet engine for propulsion purposes.

Fig. 2 is a central longitudinal sectional view thereof.

Fig. 3 is a rear end view thereof or a view looking at the left hand end of the engine shown in Figs. 1 and 2.

Fig. 4 is a front end view thereof or a view looking at the right hand end of the engine shown in Figs. 1 and 2.

Figs. 5 and 6 are vertical transverse sectional views thereof taken on the correspondingly numbered lines of Fig. 2.

Fig. 7 is a pressure wave and valve diagram of a typical resonant internal combustion engine constructed and operated in accordance with the invention and diagrammatically illustrating its principle of operation.

Figs. 8 and 9 are diagrammatic longitudinal sections of such simplified and typical engine at different times during one operating cycle and illustrating the valve positions and also the location of the wave fronts within the tube of the engine during induction and exhaust respectively.

Fig. 10 is a fragmentary transverse sectional view through the combustion chambers in rear of the igniters, generally similar to Fig. 5, and showing a modification of the ignition system.

Fig. 11 is a fragmentary radial longitudinal sectional view through one of the combustion chambers shown in Fig. 10.

Generally from a structural point of view, the resonant internal combustion engine embodying the present invention includes one or more tubes of constant or variable cross-section, rapid acting valve means arranged at opposite ends of each tube, and means for introducing fuel into each tube. The phasing of the valve means is determined by the position of the pressure waves.

The accompanying drawings illustrate one embodiment of the invention as applied to a jet engine although it is to be clearly understood that the invention has many applications and it is to be limited only as required by the appended claim.

The jet engine embodiment is shown as comprising a plurality of parallel elongated wave tubes 10 grouped in an annular row or series about a common longitudinal axis. Such a construction can be provided as shown by spaced inner and outer cylindrical shells 11 and 12, respectively, the annular space therebetween being divided by uniformly spaced radially extending walls or partitions 13. The tubes 10 so formed are open at their opposite ends. The rear portion of each tube 10 is shown as enlarged to provide a combustion chamber 14, this being accomplished by offsetting the outer shell 12 outwardly as indicated at 15 and by offsetting the inner shell 11 inwardly as indicated at 16. While twelve such tubes 10 are illustrated in the drawings it is to be understood that any number may be employed, including only one.

The rear extremities of the shells 11 and 12 are suitably contoured to form a thrust nozzle through which the exhaust gases are discharged to create a forward thrust on the jet engine. To assist in providing the desired flow of exhaust gases from the engine, the rear end is provided with a bullet shaped tail 17 arranged as a rearward extension of the inner shell 11.

The front end of the engine is provided with a diffuser to guide the intake air properly into the front ends of the tubes 10. Such diffuser is shown as being formed by an annular forwardly projecting progressively contracting extension 18 of the outer shell 12 which surrounds a bullet shaped nose 19 arranged as a forward extension of the inner shell 11.

Valve means of any suitable type are provided at the front or inlet ends of the tubes 10 and also at the rear or outlet ends of these tubes, for controlling the operation of the engine. As shown, a rotary inlet valve 20 is arranged at the inlet or front ends of the tubes 10 and a similar rotary exhaust valve 21 is arranged at the exhaust or rear ends of these tubes. Each of these valves 20 and 21 is shown in the form of a flat plate or disk having an interrupted periphery so as to provide a pair of similar diametrically opposed sector shaped closures adapted to traverse the respective ends of the tubes 10, such closures for the inlet valve 20 being indicated at 22 in Fig. 4 and the equivalent closures for the exhaust valve 21 being indicated at 23 in Fig. 3. The minimum width in a circumferential direction of each of the sector shaped closures 22 and 23 is the corresponding width of the respective end opening of any of the tubes 10. Also, each of the sector shaped closures 22 and 23 has a radial extent at least equal to that of the corresponding end of any of the tubes 10. In this manner the inlet and outlet ends of each tube can be completely closed or covered by the closures 22 and 23.

and it will be seen that the ends of the tubes are alternately opened and closed by rotation of the valves 20 and 21.

As shown in Figs. 3 and 4 the closures 22 and 23 of the rotary valves are of a circumferential width equivalent to the circumferential width of three contiguous wave tubes 10. The circumferential width of the valve closures 22 and 23 is determined by such factors as the circumferential width, length and number of the wave tubes 10 and also the speed of rotation of the valves 20 and 21. Referring to Figs. 3 and 4, it will be observed that the valve closures 22 and 23 are out of phase or in different relative angular positions, this phasing being highly critical as will be explained hereinafter.

While any suitable means for rotating the rotary valves 20 and 21 may be employed, the means shown comprise front, intermediate and rear shafts 24, 25, and 26 respectively, an electric motor 28 and a differential mechanism 29. Such means are shown as arranged within the hollow space provided by the inner shell 11. The three shafts 24, 25 and 26 are shown as arranged in coaxial alignment with one another. The motor 28 is suitably mounted within the inner shell 11 and is shown as arranged between the intermediate and rear shafts 25 and 26 respectively and is drivingly coupled to these shafts. The differential mechanism 29 which may be of any appropriate construction is also suitably mounted within the inner shell 11 and is operatively interposed between the front and intermediate shafts 24 and 25 respectively. The front end of the front shaft 24 is suitably journaled on the inner shell 11 and is suitably connected to the rotary inlet valve 20. The rotary exhaust valve 21 is suitably connected to the rear end of the rear shaft 26 which is also suitably journaled on the inner shell 11. The bullet shaped nose and tail 19 and 17 may be suitably connected with the respective valve 20 or 21 so as to rotate therewith or the nose and tail may be nonrotatively mounted, if desired.

It will thus be seen that the electric motor 28 through the drive mechanism shown will rotate the valves 20 and 21. Referring to Figs. 3 and 4, it is to be noted that the angular position of the sector shaped closures 22 of the rotary inlet valve 20 is different from the sector shaped closures 23 of the rotary exhaust valve 21. Thus the closures 22 of the rotary inlet valve 20 are shown as occupying the 10 to 1 and 4 to 7 o'clock positions while the closures 23 of the rotary exhaust valve 21 are shown as occupying the 8 to 11 and 2 to 5 o'clock positions. The purpose of the differential mechanism 29 is to permit of varying the angular positions of the rotary valves 20 and 21 one relative to the other, suitable controls (not shown) being provided for adjusting the differential mechanism. However, if such variation or adjustment is not desired the differential mechanism 29 may be eliminated and the shafts 24 and 25 can then be combined into one shaft with the rotary valves 20 and 21 preadjusted in the desired relative angular position on their driving shafts.

In accordance with the practice of the invention it is necessary to introduce fuel into the wave tubes and any suitable means may be employed for this purpose. Such fuel may be either liquid, gaseous or solid or any combination of these physical forms, although the use of a liquid fuel is preferred. It is also preferred that the fuel be fed continuously into the wave tubes although this is not essential and, if desired, the fuel may be injected intermittently. Moreover, the fuel may be introduced into the wave tubes at any place therealong. However, in the embodiment shown, a series of fuel injectors 30, one for each tube 10, are arranged on the outwardly offset wall 15 of the outer shell 12. These fuel injectors 30 are suitably connected to a fuel supply (not shown) and are for the purpose of injecting fuel continuously into the combustion chambers 14 as long as the engine is operating.

The fuel so admitted to the combustion chambers 14 is combusted with air admitted into the inlet or front ends of the tubes 10. Once the engine is operating the combustion of the fuel and air mixture so provided is self sustaining, this being the primary function of the combustion chamber configuration. It is only necessary when starting the engine to ignite the fuel and air mixture within the tubes 10 by some auxiliary means. For this purpose a series of igniters 31 of any suitable type, one for each tube 10, are shown as arranged on the outer wall 15 of the combustion chambers 14 adjacent the rear ends thereof. These igniters 31 are preferably spark or glow plugs, although any other suitable type of ignition means may be employed. It is even within the concept of the invention to provide special ignition means to ignite the combustible mixture in only one of the tubes 10 when starting the engine, and providing some suitable way of utilizing the burning mixture to ignite in turn the combustible mixtures in the other tubes. This is illustrated in Figs. 10 and 11 wherein an igniter 31a is shown as provided for one of the combustion chambers 14 and the partitions 13 of each such chamber are provided with a plurality of small holes 50 which permit jets of burning gases to enter the adjacent chamber and thereby ignite the combustible air and fuel mixture therein. Thus the mixture in each combustion chamber is ignited in succession.

It will thus be seen that it is not necessary to use timed ignition and fuel injection, although such a system may be employed, if desired. It has been found that the primary purpose of the enlarged combustion chamber 14 is to retain small regions of burning gases which enable reignition without special auxiliary ignition means. In this connection, also, ignition may be achieved by compresson of the fuel and air mixture into self-ignition once the engine is started.

It is believed that the principle of operation of the jet engine shown in Figs. 1–6 can best be understood by first explaining the operation of a simplified single tube engine having a tube 10a, an inlet valve 20a and an exhaust valve 21a, as illustrated in Figs. 7–9. The valves 20a and 21a will be considered to open and close in the proper time sequence. Fig. 7 is a typical pressure wave and valve diagram in which time as the ordinate is plotted against displacement along the axis of the wave tube as the abscissa. The valves 20a and 21a are illustrated only when closed and at all other times these valves are open. The horizontal distance between the valves 20a and 21a is representative of the axial length of the tube 10a, the latter being illustrated only in Figs. 8 and 9. Fig. 8 is a diagrammatic representation of the condition of the wave tube 10a during "induction," this figure corresponding to line 8—8 of Fig. 7. Fig. 9 is a similar diagrammatic representation of the condition of the wave tube 10a during "exhaust," this figure corresponding to line 9—9 of Fig. 7.

In general, the principle of operation is to utilize the pressure waves generated through the combustion and valve action to compress the combustible mixture of fuel and air prior to ignition, scavenge the exhaust products, and induce a fresh charge of air. The sudden closing of the exhaust valve 21a after discharging the burnt mixture from a preceding cycle produces a so-called hammer compression wave or shock wave 35 which travels upstream in the tube 10a toward the now open inlet. The combustible mixture consisting of fuel and air within the tube at the rear end thereof is ignited in the high pressure region 37 (Fig. 8) which always occurs behind the compression wave 35 and further raises the pressure thereby reinforcing the compression wave 35. The flame front of this ignited high pressure region 37 is represented by the line 36. When the compression wave 35, which travels with about the speed of sound, reaches the inlet end of the tube, the inlet valve 20a is closed and the compression wave impinges thereagainst and is reflected to conserve the wave energy involved. The reflected compression wave is represented by the line 351.

As the shock wave 35 reaches the inlet valve 20a the exhaust valve 21a is reopened and an expansion wave is set up or generated by the pressure drop within the tube resulting from the burnt or exhaust gases discharging through the outlet end of the tube. This expansion wave is represented by the series of radiating lines 38 in Fig. 7. This expansion wave moves upstream along the wave tube 10a behind the shock wave 35. When the expansion wave 38 reaches the inlet valve 20a the pressure on the inner side of the inlet valve 20a drops below the pressure on the outer side of this valve or the inlet pressure. At this time the inlet valve 20a is opened and a fresh charge of air is inducted into the tube 10a. The line 39 represents the front of the inducted air charge.

Referring to Fig. 7 it will be noted that the expansion wave 38 influences the flame front 36 to cause the same to recede toward the rear or exhaust end of the wave tube. It will also be noted that the rearwardly moving reflected compression wave 351 and the forwardly moving expansion wave 38 intersect or cross each other within the wave tube and influence each other. Thus the reflected compression wave 351 is accelerated in moving toward the rear or exhaust end of the tube by crossing the expansion wave 38 and the forward movement of the expansion wave is decelerated by intersection with the oppositely moving reflected compression wave.

The reflected compression wave 351 continues to move toward the rear or exhaust end of the wave tube 10a and is timed to set up the compression wave 352 of the next cycle. As the reflected compression wave 351 approaches the rear or exhaust end of the wave tube, the air and fuel mixture within the tube is compressed by engagement with the reflected compression wave. However, the reflected compression wave 351 continues to travel through this compressed mixture and as this wave is about to leave the tube the exhaust valve 21a is closed thereby reflecting the wave. At the same time the ignition of the compressed air and fuel mixture suddenly raises the pressure at the rear end of the tube which operates to reinforce the compression wave 352 and in this manner the next succeeding cycle begins.

In other words, it might be regarded that there is a continuously burning region at the exhaust end of the tube 10a and which has a flame front which oscillates within the rear portion of the tube in response to the opening and closing of the exhaust valve 21a. This flame front can propagate upstream or toward the inlet end of the tube only when the exhaust valve 21a is closed. The sudden closing of this exhaust valve cuts off escape of the burnt gases and propagates the flame front upstream by burning through the compressed fuel and air mixture. This causes a sudden increase in pressure thereby producing a shock wave coinciding with the reflected shock wave from the preceding cycle. Thus by properly timing and phasing the alternate opening and closing of the valves 20a and 21a, the newly generated shock wave is made to coincide with the reflected shock wave so that a compression wave resonates within the tube between the inlet and exhaust valves. It is to be noted that effective combustion is accomplished solely by closing the exhaust valve 21a and by alternately opening and closing this valve rapidly in proper time and phase to the alternate opening and closing of the inlet valve 20a, intermittent combustions are provided effective to reinforce the resonating compression wave and to maintain such resonation which is utilized to compress the fuel and air mixture within the tube prior to ignition of such mixture during each cycle of operation of the engine.

During the induction of a fresh charge of air at the time represented by Fig. 8, it will be seen that with the exhaust valve 21a closed and the inlet valve 20a open, the compression wave 35 and frame front 36 are propagated upstream with the flame front lagging the compression wave, while the front 391 of the inducted air is propagated downstream.

During exhaust of the burnt gases at the time represented by Fig. 9, it will be observed that with the inlet valve 20a closed and the exhaust valve 21a open, the reflected compression wave 351 and the flame front 36 are moving downstream with the flame front preceding the reflected compression wave. Actually at this time the front 391 of the air inducted from the previous cycle is moving upstream slightly under the influence of its recent intersection with the compression wave 35 moving upstream. In this connection, the reflected compression wave 351 subsequently again intersects the air front 391 and influences it to move downstream. The intersection of the expansion wave 38 with the air front 391 also influences the latter to encourage it to move downstream. It will thus be seen that during each cycle of operation a fresh charge of air is inducted into the wave tube and although influenced by intersection with the compression wave moving upstream and downstream and also influenced by the intersection with the expansion wave, this inducted charge of air works downstream in a few cycles to combine with the injected fuel to provide a combustible mixture which is first compressed and then ignited to sustain the resonation of the compression wave.

Returning now to the description of the operation of the jet engine shown in Figs. 1–6, it will be seen that this engine is merely a plurality of tubes, each similar to the tube 10a with its inlet valve 20a and exhaust valve 21a shown in Figs. 7–9, and each operating independently of the other but arranged into a unitary structure having an appropriate valve arrangement and fuel injection and ignition means to develop the desired amount of thrust to render it suitable for a jet engine. The rotary valves 20 and 21 are driven by the electric motor 28 with the differential mechanism 29 adjusted to maintain the desired phase relationship between the sector shaped closures 22 and 23 of these valves so as to open and close the ends of any particular tube 10 in the proper timed sequence. The rotational speed of the rotary valves 20 and 21 is based upon the velocity of the pressure waves.

The engine is started by introducing fuel into the combustion chambers 14 through the fuel injectors 30, and by energizing the igniters 31 to combust the fuel and air mixtures within the various combustion chambers. Thereafter the igniters 31 may be deenergized or turned off since the operation of the engine will be sustained without any special ignition means. When the exhaust valve 21 is closed for a particular wave tube 10, the combustible mixture in its combustion chamber 14 is ignited and a high pressure or shock wave is generated by the pressure rise and this pressure wave propagates upstream or toward the open front end of the tube. When this pressure wave reaches the front end of the tube, the rotary inlet valve 20 closes off this tube, and the wave reflects from this valve. During this process the rotary exhaust valve 21 is moved to uncover the rear end of the tube and the exhaust gases are discharged out the open rear end of the tube. The pressure drop attending such discharge of the exhaust gases generates an expansion wave which propagates upstream. This upstream propagation of the expansion wave takes place while the reflected pressure wave is propagating downstream. When this reflected pressure wave nears the rear end of the tube, the rotary exhaust valve 21 closes off this tube and fuel, injected into the tube by its fuel injector 30, mixes with fresh air within this tube and the resultant combustible mixture is compressed by this wave for the next cycle which is started by ignition of this mixture. When the expansion wave which propagates upstream reaches the rotary inlet valve 20, this valve is moved to open the tube and, due to the low pressure created, a fresh charge of air is inducted. In this manner the rotary valves 20 and 21 and the fuel injection and ignition system are so timed as to operate the various tubes 10 successively and continuously.

It will thus be seen that for a given tube length and valve rotational speed, the phase angle between the rotary valves 20 and 21 is determined by the time required for the pressure waves to propagate upstream. Also, the rotational speed of the rotary valves 20 and 21 and their configuration are determined by the time of travel of these waves.

Such a resonant internal combustion engine can be throttled by controlling the amount of fuel introduced into the combustion chamber. In the jet engine embodiment shown in Figs. 1–6, throttling can be achieved either by controlling the amount of fuel injected or by turning on or off more tubes, leaving those not turned off to continue to operate on the same amount of fuel, or by doing both.

It will also be observed that it is immaterial and a matter of choice as to whether the valves 20 and 21 rotate with respect to the tubes or these tubes are rotated with respect to these valves.

While special ignition means such as the igniters 31 are necessary to start the operation of the engine, it may continue to run without special ignition means. The engine is stopped or any one of its tubes 10 by cutting off the supply of fuel to its combustion chamber.

The present invention has many applications and it is not intended to limit the invention to any one application. For example, the invention may be used directly as a jet engine for propulsion purposes as shown in Figs. 1–6. The invention may also be used as a gas generator to drive a turbine or as a topping unit when used in conjunction with a gas turbine and compressor.

There are important advantages of a jet engine embodying the present invention over a conventional turbojet. Firstly, the construction cost is much less expensive since the use of waves in the practice of the present invention eliminates the conventional compressor and turbine and replaces them with simple rotating valves. Secondly, since the turbine is eliminated, temperature problems are minimized. Thirdly, the geometry of an engine embodying the present invention is such that much lower rotational speeds of the rotary valves may be utilized than for the turbine of the conventional turbojet. Fourthly, since each wave tube of the present invention operates individually, the problem of throttling may easily be accomplished without loss in efficiency and the efficiency of each wave tube will be equal to or greater than that of a conventional turbojet.

While rotary valves are shown in the illustrated embodiment of the invention as driven by a common drive mechanism, it will be understood that the inlet and exhaust valves may be of completely different types and also independently actuated as long as these valves alternately open and close the ends of the wave tubes at the proper times to effect the operation of the engine on the principle disclosed. For example, the inlet valve may be a pressure responsive valve, opening and closing in response to the pressures on opposite sides of this valve.

It is to be noted that an engine embodying the present invention does not require motion through the air to sustain its operation since air is inducted into the inlet or front end of the wave tube. Accordingly, the engine will operate while remaining stationary.

From the foregoing it will be seen that the present invention provides a resonant internal combustion engine, which is simple is construction, inexpensive to manufacture, efficient, easy to throttle, and capable of many applications.

We claim:

A resonant internal combustion engine, comprising a tube having an inlet end and an outlet end and a portion thereof providing a combustion chamber adjacent said outlet end, means arranged to introduce fuel into said tube, inlet valve means arranged to alternately open and close said inlet end, and outlet valve means arranged to alternately open and close said outlet end, said inlet and outlet valve means being so constructed and operatively phased to each other that combustion of the fuel and air mixture in said combustion chamber when said outlet end is closed by said outlet valve means during any one cycle of operation generates a compression wave which is propagated toward said inlet end while the same is open but closed by said inlet valve means in time to reflect said compression wave toward said outlet end, said outlet valve means uncovering said outlet end before said compression wave is so reflected but closing said outlet end in time to permit said reflected compression wave to compress a mixture of fuel and air within said tube for combustion during the succeeding cycle, the said uncovering of said outlet end permitting the discharge of the exhaust products resulting from said combustion and generating an expansion wave which propagates toward said inlet end, said inlet valve means closing said inlet end during the last mentioned propagation but uncovering said inlet end as the expansion wave reaches the same to induct a fresh charge of air therethrough.

References Cited in the file of this patent

UNITED STATES PATENTS

| | | |
|---|---|---|
| 1,980,266 | Goddard | Nov. 13, 1934 |
| 2,486,967 | Morrisson | Nov. 1, 1949 |
| 2,500,712 | Serrell | Mar. 14, 1950 |
| 2,515,644 | Goddard | July 18, 1950 |
| 2,543,758 | Bodine | Mar. 6, 1951 |
| 2,550,515 | Anderson | Apr. 24, 1951 |
| 2,579,321 | Kadenacy | Dec. 18, 1951 |
| 2,594,765 | Goddard | Apr. 29, 1952 |
| 2,659,198 | Cook | Nov. 17, 1953 |

FOREIGN PATENTS

| | | |
|---|---|---|
| 424,955 | Great Britain | Dec. 1, 1933 |